(12) United States Patent
Wakabayashi

(10) Patent No.: US 6,167,772 B1
(45) Date of Patent: Jan. 2, 2001

(54) ARRANGEMENT FOR ATTACHING GEARSHIFT ASSEMBLY AND METHOD OF ASSEMBLING THE SAME

(75) Inventor: Hideaki Wakabayashi, Aichi (JP)

(73) Assignee: Mitsubishi Jidosha Kogyo Kabushiki Kaisha, Tokyo (JP)

(*) Notice: Under 35 U.S.C. 154(b), the term of this patent shall be extended for 0 days.

(21) Appl. No.: 09/168,159

(22) Filed: Oct. 8, 1998

(30) Foreign Application Priority Data

Oct. 8, 1997 (JP) .................................................... 9-275581

(51) Int. Cl.[7] ............................... G05G 1/00; B60K 26/00
(52) U.S. Cl. ............................................... 74/469; 180/315
(58) Field of Search ................................. 74/473.1, 469; 296/24.1; 180/315, 336

(56) References Cited

U.S. PATENT DOCUMENTS

| | | | |
|---|---|---|---|
| 4,364,450 | * 12/1982 | Kemp et al. | 180/336 |
| 5,335,751 | * 8/1994 | Kuroki | 180/336 |
| 5,388,476 | * 2/1995 | Harger et al. | 74/473.1 |
| 5,829,309 | * 11/1998 | Wagner et al. | 74/473.1 X |

FOREIGN PATENT DOCUMENTS

| | | |
|---|---|---|
| 60-10911 Y2 | 4/1985 | (JP) . |
| 2383310 U | 3/1990 | (JP) . |
| 5246262 | 9/1993 | (JP) . |

* cited by examiner

*Primary Examiner*—David A. Bucci
*Assistant Examiner*—Colby Hansen

(57) ABSTRACT

An arrangement for attaching a gearshift assembly for a motor vehicle is provided, wherein a shift lever device for performing a gearshift operation of a transmission of the vehicle is installed on an instrument panel, without causing variations in the position of installation of a shift lever. In the present arrangement, the shift lever device is positioned relative to the instrument panel by means of a guide pin, and a console panel is positioned relative to the instrument panel using positioning holes. Thus, the position of the console panel relative to the shift lever device is determined with high accuracy on the basis of the instrument panel, and the shift lever device is mounted on the instrument panel without causing a variation in the position of installation of the shift lever.

6 Claims, 7 Drawing Sheets

ARRANGEMENT FOR ATTACHING GEARSHIFT ASSEMBLY AND METHOD OF ASSEMBLING THE SAME

FIELD OF THE INVENTION

The present invention relates to an arrangement for attaching a gearshift assembly for a motor vehicle wherein a shift lever device that performs a gearshift operation of a transmission is installed on a panel, such as an instrument panel, that extends in a lateral or width direction of the vehicle in a vehicle compartment.

BACKGROUND OF THE INVENTION

Various structures have been proposed wherein a shift lever device (hereinafter, referred to as "gearshift assembly") for performing a gearshift operation of the transmission is installed on an instrument panel of the vehicle, so that the space of the floor of the vehicle can be effectively utilized. For example, laid-open Publication (Kokai) No. 2-38331 of unexamined Japanese Utility Model Application discloses a structure wherein a mounting plate extends between a pipe on which a steering shaft is mounted, and a support pipe for supporting a heater unit, and a gearshift assembly is mounted on the mounting plate, so that a change lever used for gearshift operations is located at a lower, central portion of the instrument panel.

Also, Publication No. 60-10911 of examined Japanese Utility Model Application and laid-open Publication (Kokai) No. 5-246262 of unexamined Japanese Patent Application disclose a structure wherein a main body of an assembly having a change lever used for manual gearshift operations or a shift lever used for automatic gearshift operations is mounted on an instrument portion located on one side of the steering wheel. In this type of gearshift assembly, a shift lever device including an operating lever, such as a change lever or shift lever, and a support member, are formed as an integral unit, which is to be mounted on the instrument portion located above the floor of the vehicle. By fixing the support member to a member, such as a cross member, that constitutes the vehicle body, the gearshift apparatus is attached to a certain position of the vehicle body.

Since the conventional structure, in which the shift lever device (gearshift assembly) is mounted on the instrument panel of the vehicle, does not include an arrangement for positioning the main body of the device and a cover, or the like, the position of installation of the operating lever, such as a change lever or shift lever, may vary.

In the gearshift assembly for performing manual gearshift operations, the change lever is operated in a gear shift direction and a gear select direction, and a boot-like member is provided extending over the cover and the proximal portion of the change lever. Therefore, no problem arises due to variations in the position of installation of the change lever as long as it is not significant.

In the gearshift assembly for performing automatic gearshift operations, a shift panel provided with a labeled portion indicating the operated positions of the shift lever is attached to a cover, or the like, for covering the shift lever device. This makes it necessary to keep a predetermined positional relationship between the operated positions of the shift lever and the corresponding positions (P, R, N, D, and so on) of the labeled portion indicating the operated positions. If, however, there are variations in the installation position of the shift lever due to a positional shift or variation between the shift lever and the cover, and an error arising upon mounting of the shift panel on the cover, it will result in deviations of the operated positions of the shift lever with respect to the corresponding positions of the labeled portion, thus deteriorating the appearance of the gearshift assembly.

SUMMARY OF THE INVENTION

It is therefore an object of the present invention to provide an arrangement for attaching a gearshift assembly for a motor vehicle, wherein a shift lever device that allows a driver to perform a gearshift operation of the transmission is attached to a panel, such as an instrument panel, that extends in the lateral direction in the vehicle compartment, without suffering from variations in the position of installation of a shift lever, and a method of assembling the gearshift assembly.

To accomplish the above object, the present invention provides an arrangement for attaching a gearshift assembly for a motor vehicle, wherein a shift lever device for a gearshift operation of a transmission of the vehicle is installed on a panel that extends in a lateral direction of the vehicle within a vehicle compartment, comprising: a receiving portion provided at a portion of the vehicle lower than the panel; an engaging portion formed at a lower portion of the shift lever device, the receiving portion of the panel engaging with the engaging portion to support the shift lever device such that the shift lever device is rotatable about the receiving portion; and a mounting portion provided at a portion of the shift lever device higher than the receiving portion, for allowing the shift lever device to be attached to the panel while the receiving portion is being held in engagement with the engaging portion.

The present invention also provides a method of assembling a gearshift assembly for a motor vehicle, wherein a shift lever device for a gearshift operation of a transmission of the vehicle is installed on a panel that extends in a lateral direction of the vehicle within a vehicle compartment, comprising: positioning a first portion of the shift lever device relative to a portion of the vehicle lower than the panel; rotating the shift lever device about a rotary axis provided by the positioned first portion of the shift lever device; and attaching a second portion of the shift lever device higher than the first portion to an upper portion of the panel.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
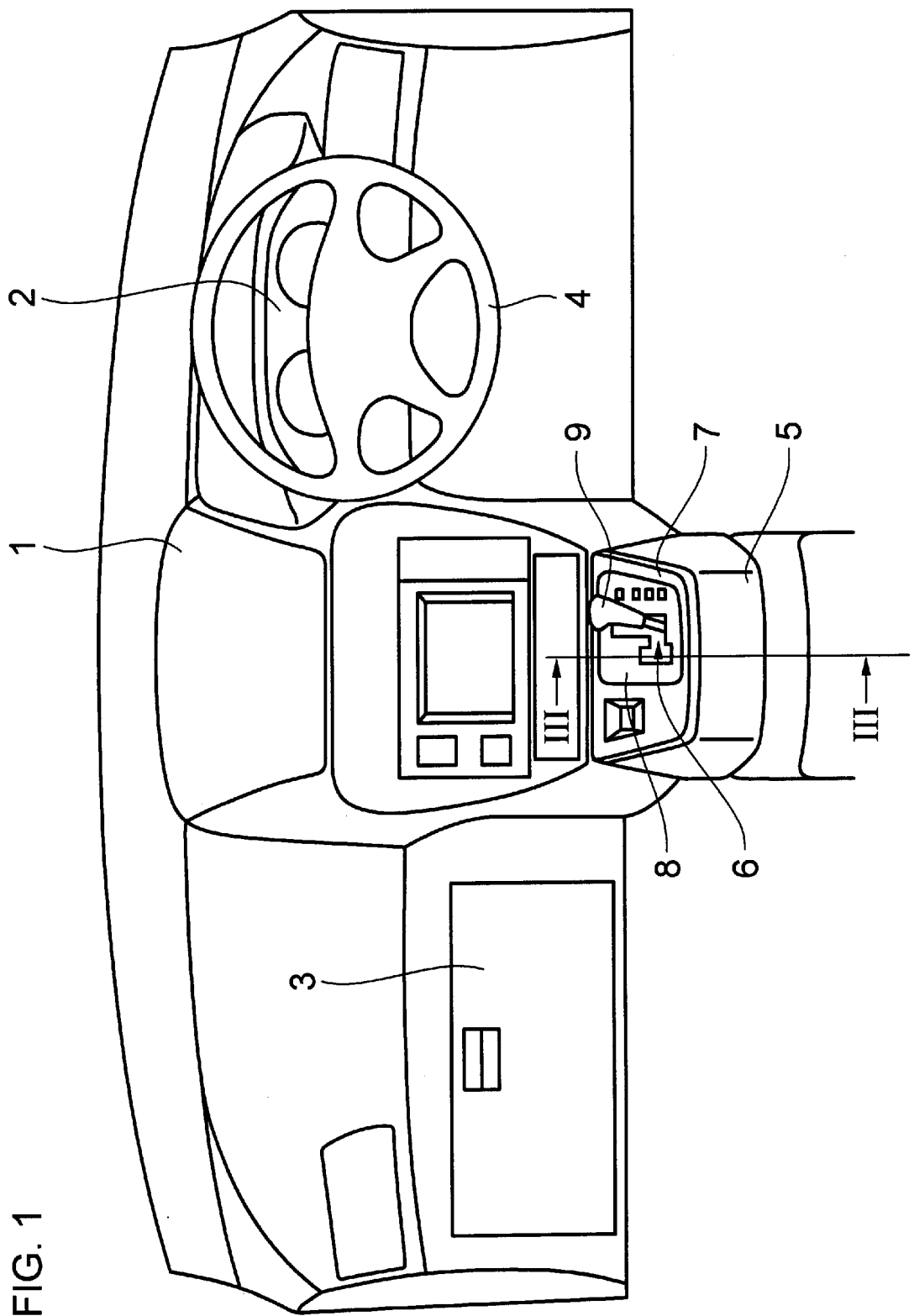
FIG. 1 is a front view showing an instrument panel and its vicinity of an automobile equipped with a gearshift assembly according to one preferred embodiment of the present invention.
Figure 2:
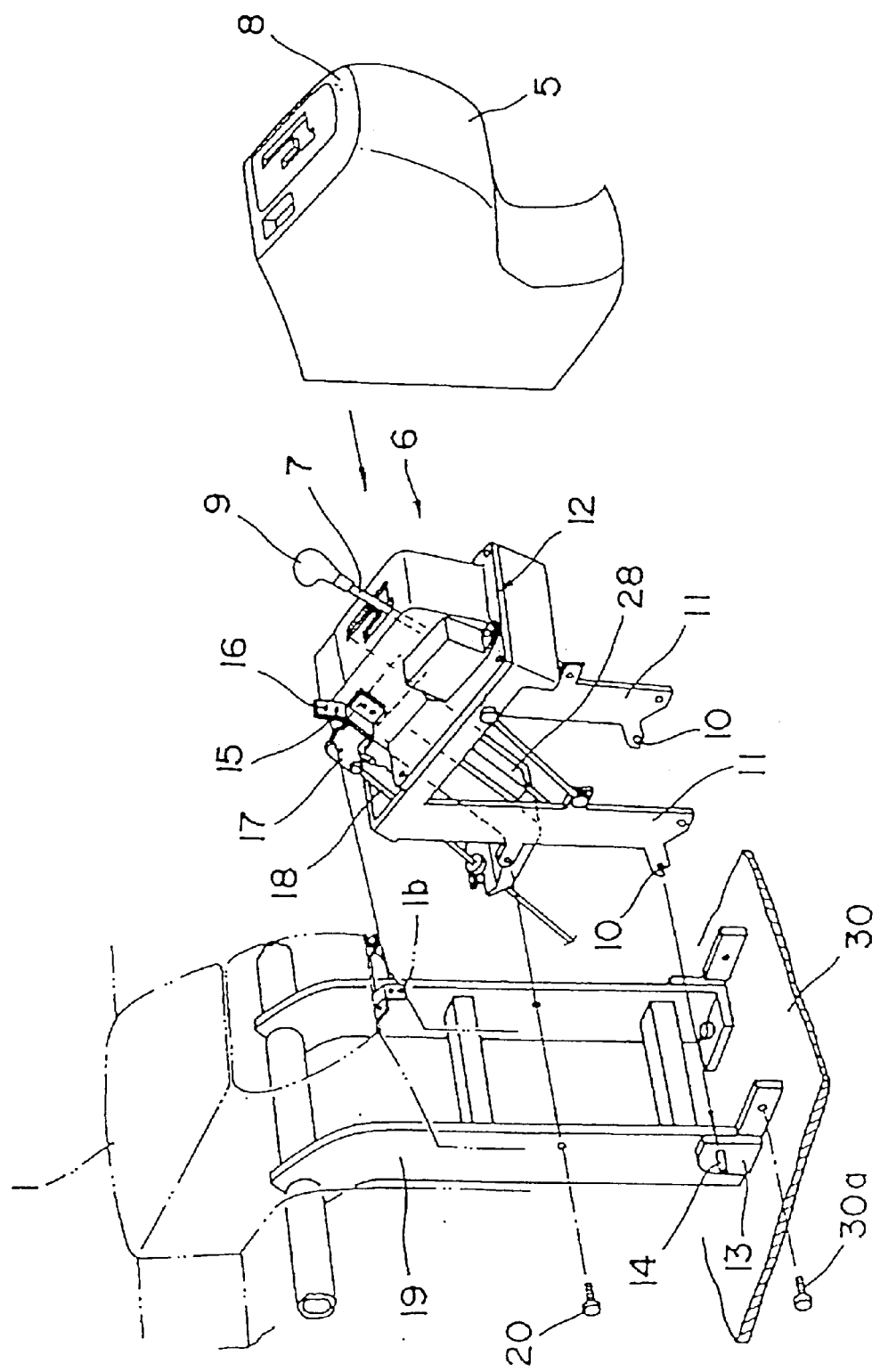
FIG. 2 is an exploded, perspective view of the gearshift assembly of FIG. 1.
Figure 3:
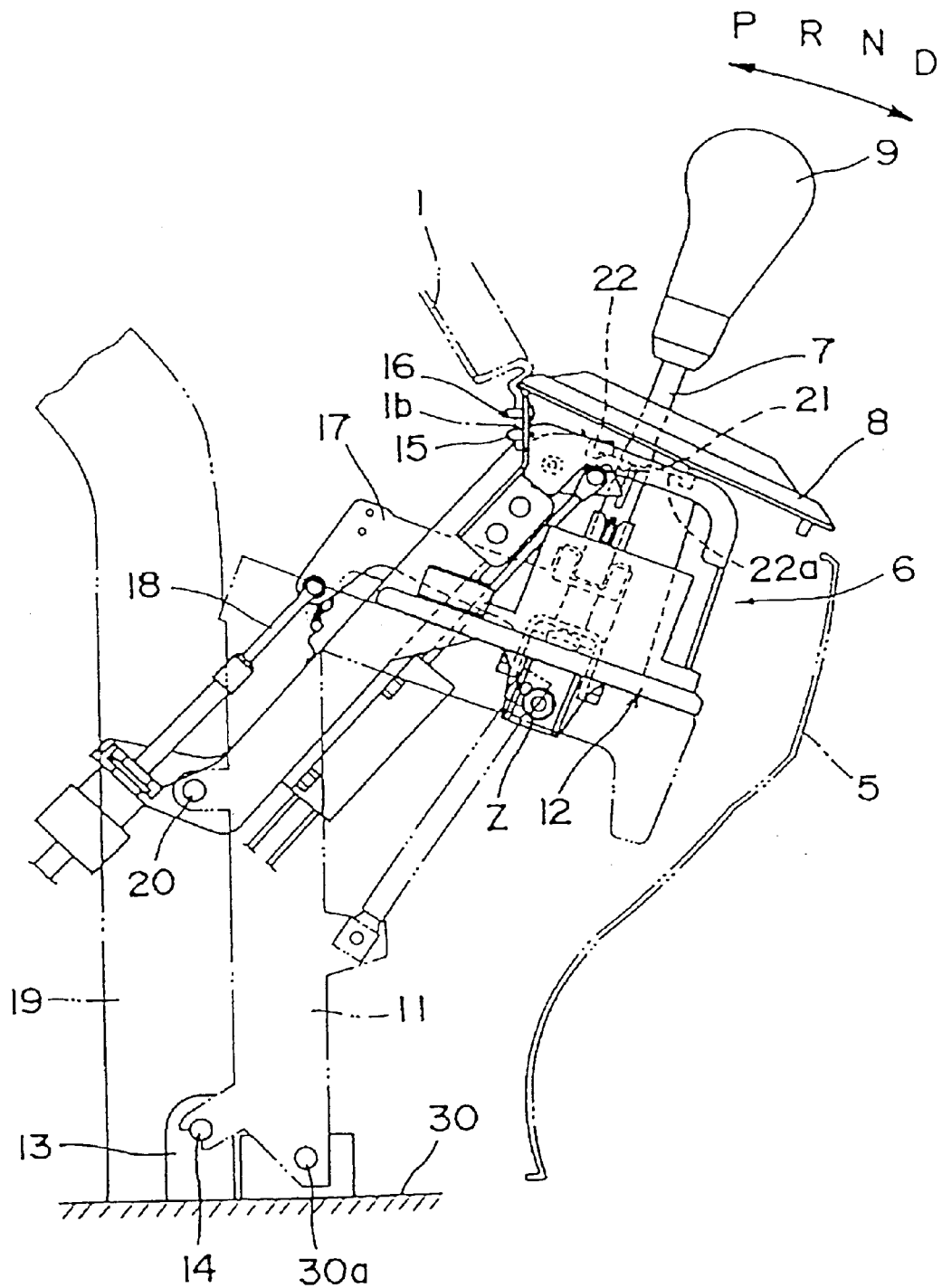
FIG. 3 is a cross-sectional view of the gearshift assembly along III—III line of FIG. 1.

FIG. 1 is a front view showing an instrument panel and its vicinity of an automobile equipped with a gearshift assembly to which an assembling method according to one preferred embodiment of the present invention is applied. FIG. 2 and FIG. 3 are an exploded, perspective view and a cross sectional view, respectively, of the gearshift assembly, and FIG. 4 is an exploded, perspective view showing a console box of the assembly.

As shown in FIG. 1 and FIG. 2, an instrument panel 1 extends in the lateral or width direction of the vehicle within a vehicle compartment, and a meter panel 2 is provided on the driver's side (i.e., the right-hand side in FIG. 1) of the panel 1 while a glove box 3 is provided on the passenger's side (i.e., the left-hand side in FIG. 1). A shift lever device 6, whose side faces are covered with a console panel 5, is provided at a central portion of the instrument panel 1, such that the shift lever device 6 is located on one side of a steering wheel 4.

Figure 4:
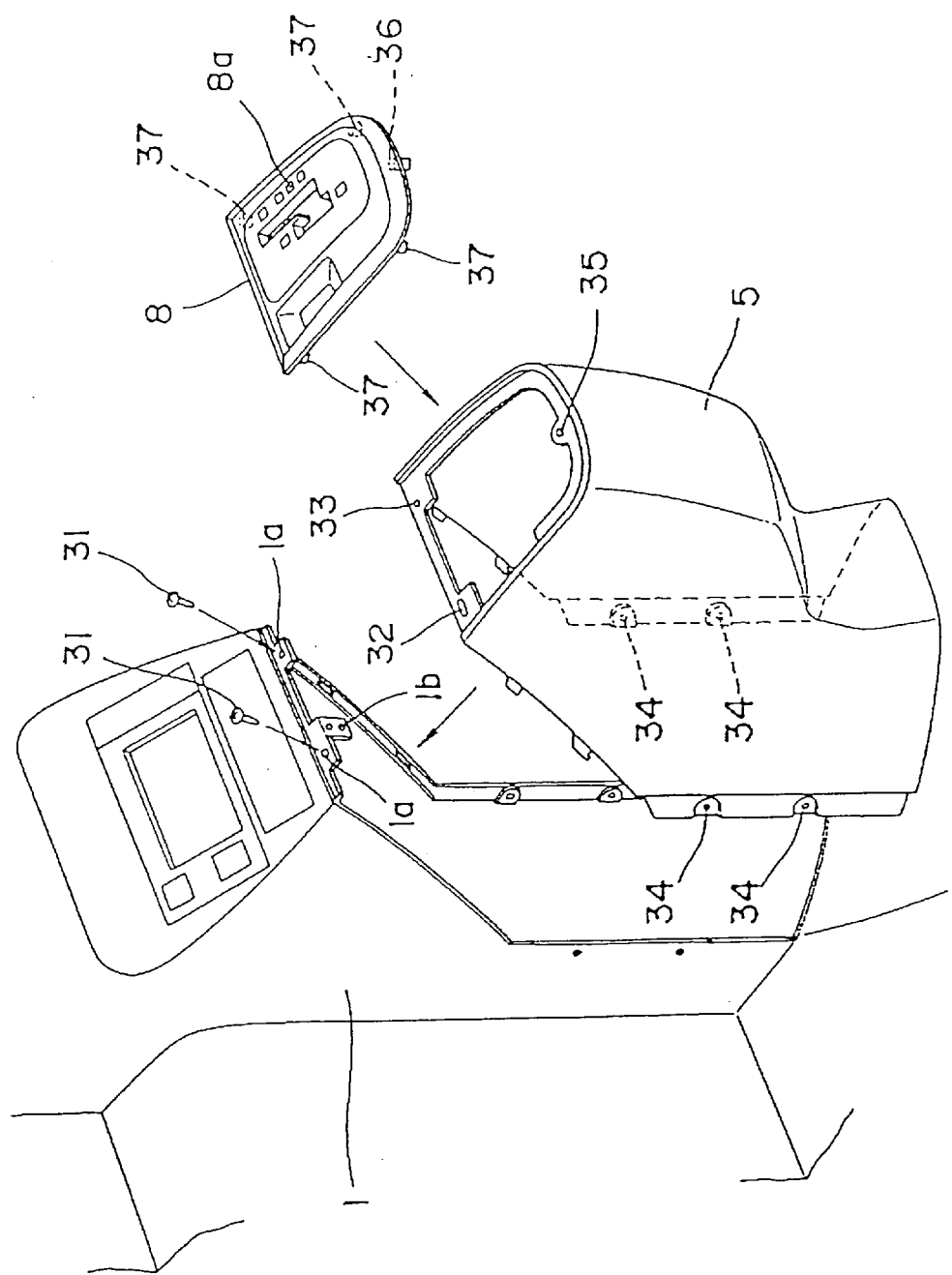
FIG. 4 is an exploded, perspective view showing a console panel of the gearshift assembly of FIG. 1.

The console panel 5 has an opening at its upper portion, as shown in FIG. 4, and the opening is covered with a shift panel 8 through which a shift lever 7 of the shift lever device 6 extends. The shift lever device 6 is attached to reinforcements 19 (FIG. 2) for fixedly holding the instrument panel 1, and is covered with the console panel 5 and the shift panel 8.

The construction of the shift lever device 6 covered with the console panel 5 and the shift panel 8 will be described with reference to FIG. 2 and FIG. 3.

A pedestal 12 is fixed to a support frame 11 of the shift lever device 6, and the shift lever 7 is supported by the pedestal 12 such that the lever 7 may pivot about its proximal end portion Z in the front-to-rear direction of the vehicle. A shift lever knob 9 is attached to the upper end of the shift lever 7. Notches 10 are formed at the lower end portions of the support frame 11, for engagement with corresponding support bolts 14 that are fixed to support members 13 on the side of a floor 30 of the vehicle. Thus, the support frame 11 is positioned due to engagement between the notches 10 and the bolts 14, such that the frame 11 may freely rotate or pivot about the bolts 14. The upper end portion of the pedestal 12 is fixed to the instrument panel 1 with a guide pin 15 and a fixing screw 16, and the upper portion of the support frame 11 is fixed to the reinforcements 19 by means of bolts 20. Also, the lower end of the support frame 11 is fixed to the floor 30 by means of bolts 30a.

A plate 17 is provided in the vicinity of the shift lever 7, and an end portion of a gearshift wire 18 that leads to a transmission or gearbox (not illustrated) is attached to the plate 17. By manipulating the shift lever 7 in the front-to-rear direction of the vehicle, the transmission is operated to a desired gear position with the movement of the shift lever 7 transmitted via the gearshift wire 18.

For example, the shift lever 7 may be operated to a selected one of a park position (P range), rear-drive position (R range), neutral position (N range), and a forward-drive position (D range), which are arranged in this order from the front side of the vehicle. When the shift lever 7 is placed in the D range, an appropriate gear position is automatically selected depending upon running conditions of the vehicle. The shift lever 7 is movable in the width direction of the vehicle while it is placed in the D range. After moving the shift level 7 in the width direction (towards left in FIG. 1), the gear position of the transmission can be manually changed by moving the shift lever 7 in a desired forward or rearward direction.

The shift lever 7 is provided with a detent pin 21 that may be shifted downward against a spring force when the driver pushes a button (not illustrated). While the button is not pushed, the detent pin 21 is biased upward due to the spring force, to engage with one of grooves 22a formed in a detent plate 22. The grooves 22a of the detent plate 22 are formed in sequence to correspond to the P, R, N, and D ranges. Due to the engagement of the detent pin 21 with one of the grooves 22a of the detent plate 22, the pivotal movement of the shift lever 7 between two ranges, except between the D range and the N range, is restricted. Namely, where a driver wishes to operate the shift lever 7 from the P range to the R range or D range, for example, he/she is supposed to push the button (not illustrated) to disengage the detent pin 21 from the groove 22a of the detent plate 22, and move the shift lever 7 in this state.

Referring next to FIG. 3 and FIG. 4, the manner of supporting the gearshift assembly will be now described.

As shown in FIG. 3, the lower end portions of the support frame 11 of the shift lever device 6 are brought into engagement with the support bolts 14 fixed to the support members 13 on the side of the floor of the vehicle, such that the support frame 11 may pivot about the bolts 14. Thus, the lower end portions of the support frame 11 are positioned by the first positioning mechanism. In this state, in which the lower end portions of the support frame 11 are in engagement with the support bolts 14, the guide pin 15 located at the upper end portion of the pedestal 12 engages with a positioning hole 1b formed at a certain position of the instrument panel 1 in the vicinity of the shift panel 8, so that the position of the upper portion of the shift lever device 6, relative to the instrument panel 1, is determined by the second positioning mechanism.

As shown in FIG. 4, positioning holes 32, 33 are formed at two locations of the upper face of the console panel 5 on its front side, and the console panel 5 is fixed to the instrument panel 1 by means of fixing screws 31 that are screwed into mounting holes 1a of the panel 1 and the positioning holes 32, 33. One of the fixing holes 32 has an elongated shape having a longer axis in the vehicle width direction. With this arrangement, the console panel 5 is positioned relative to the instrument panel 1 by the third positioning mechanism. Also, the side faces of the console panel 5 are fixed to the instrument panel 1, using a plurality of mounting holes 34.

As described above, the shift lever device 6 is positioned relative to the instrument panel 1, due to the engagement of the guide pin 15 with the positioning hole 1a, and the console panel 5 is positioned relative to the instrument panel 1, by use of the fixing holes 32, 33. Thus, the shift lever device 6 and console panel 5 are suitably positioned relative to the instrument panel 1. Consequently, the console panel 5 is positioned relative to the shift lever device 6 with high accuracy, on the basis of the instrument panel 1.

In addition, a positioning hole 35 is formed at the rear side of the upper face of the console panel 5, and a pin 36, formed on the rear face of the shift panel 8, engages with the positioning hole 35 so that the shift panel 8 is positioned relative to the console panel 5. The shift panel 8 is attached to the upper opening portion of the console panel 5, due to the engagement of the pin 36 with the positioning hole 35, and engagement of a plurality of claws 37 with the edge of the opening of the console panel 5.

Since the shift panel 8 is positioned relative to the console panel 5 due to the engagement of the pin 36 with the positioning hole 35, the position of the shift panel 8, relative to the shift lever 7 of the shift lever device 6, is also determined. Further, the shift lever device 6 is positioned due to the engagement of the guide pin 15 of the device 6 with the positioning hole 1b formed in the vicinity of the shift panel 8. This arrangement results in reduction in the degree of deviation of the operated positions of the shift lever 7 from corresponding shift positions (P, R, N, D, and so on) indicated on a labeled portion 8a of the shift panel 8.

Figure 5A:
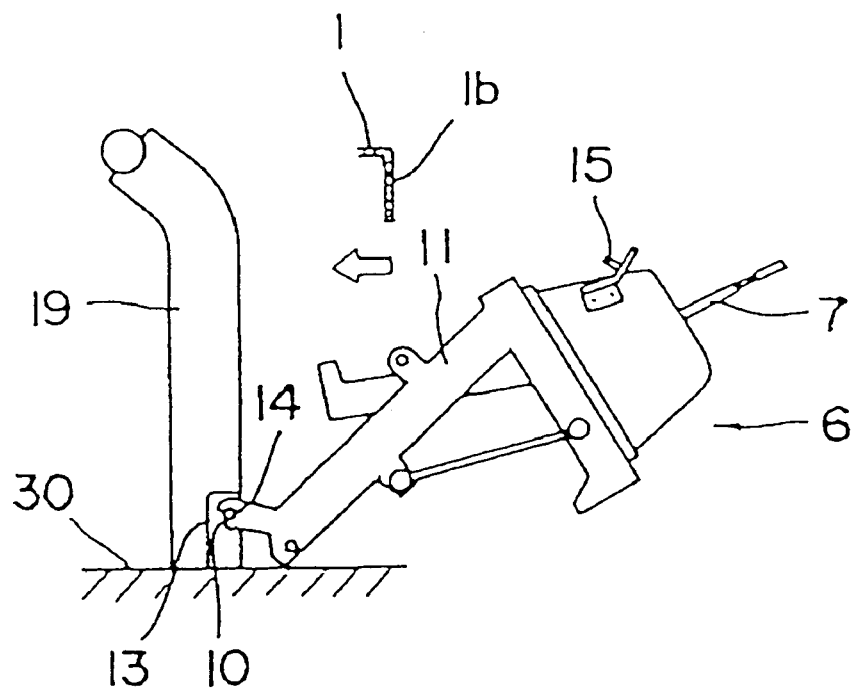
FIG. 5(a) through FIG. 5(c) are views useful in explaining the process of assembling the gearshift assembly of FIG. 1.
Figure 5B:
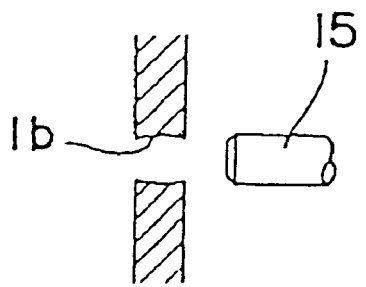
Figure 5C:
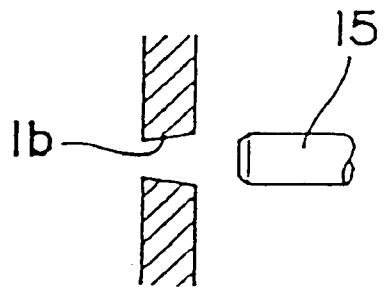
Figure 6:
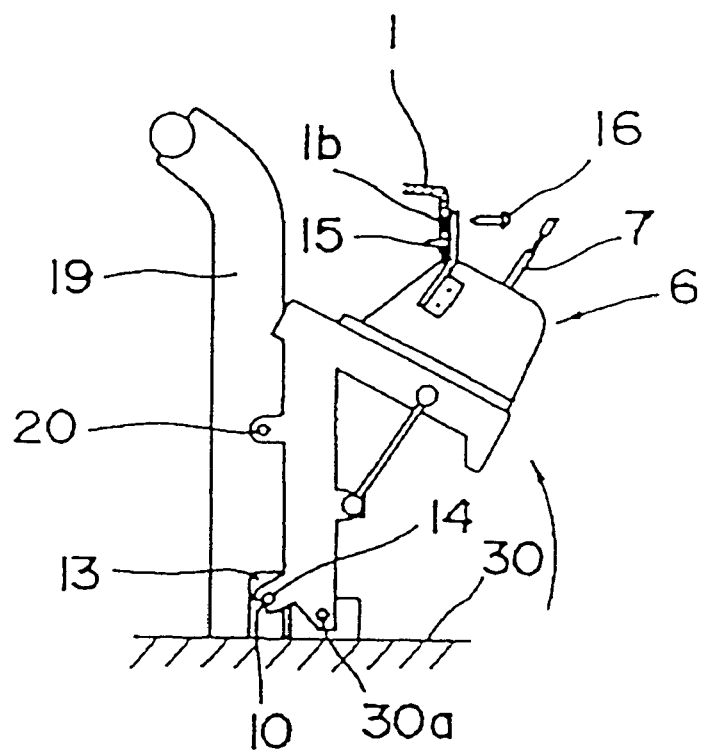
FIG. 6 is a view useful in explaining the process of assembling the gearshift assembly of FIG. 1.
Figure 7A:
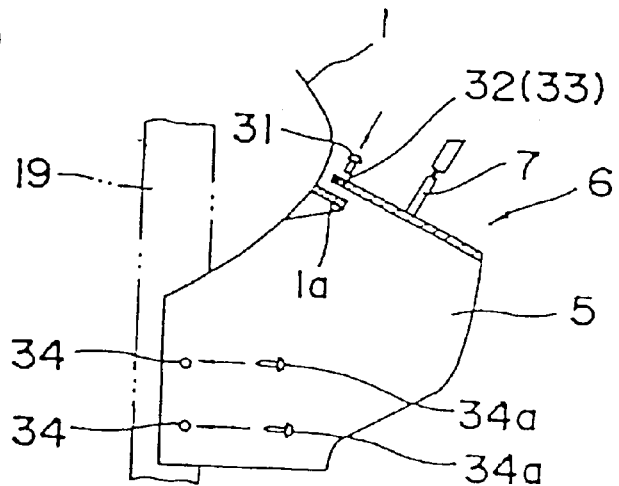
FIG. 7(a) through FIG. 7(c) are views useful in explaining the process of assembling the gearshift assembly of FIG. 1.

Referring to FIG. 5 through FIG. 7, a method of assembling the gearshift assembly constructed, as described above, will be explained. FIGS. 5–7 show respective steps of assembling the gearshift assembly.

Initially, the instrument panel 1, along with the reinforcements 19, is fixed in the vehicle compartment, and the shift lever device 9, to which the shift lever knob 6 is not attached, is fixed to the vehicle body and the instrument panel 1. Namely, as shown in FIG. 5(a), the notches 10 of the support frame 11 are brought into engagement with the support bolts 14 of the support members 13 while the shift lever device 6 is being laid down, so that the lower end portion of the shift lever device 6 is positioned relative to the lower portion of the instrument panel 1.

After engaging the notches 10 with the support bolts 14, the shift lever device 6 is raised about the support bolts 14 as pivot axes, and the guide pin 15 is brought into engagement with the positioning hole 1b of the instrument panel 1. The distal end portion of the guide pin 15 is tapered, to provide a tapered face as shown in FIG. 5(b). In the process of engaging the guide pin 15 with the positioning hole 1b, the upper end portion of the shift lever device 6 is positioned relative to the upper portion of the instrument panel 1. Instead of tapering the distal end portion of the guide pin 15, the positioning hole 1b may be tapered, as shown in FIG. 5(c).

After positioning the upper end portion of the shift lever device 6, the upper end portion of the shift lever 6 is fixed to the upper portion of the instrument panel 1 by means of the fixing screw 16. Also, the lower end portions of the support frame 11 are attached to the floor 30 by means of the bolts 30a, and the support frame 11 is attached to the reinforcements 19 by means of the bolts 20, so that the shift lever device 6 is fixed to both the instrument panel 1 and the vehicle body.

In the manner as described above, the shift lever device 6 can be easily positioned with high accuracy and fixed to the instrument panel 1, while requiring a relatively small number of assembling steps. Also, while the engaging portions of the notches 10 of the support frame 11 with the bolts 14 receive the load of the shift lever device 6 and position its lower portion, the shift lever device 6 having a large weight is rotated about the support bolts 14 to be raised to the nominal position, so that the upper portion of the device 6 is positioned and attached to the instrument panel 1. Thus, the shift lever device 6 can be fixed in position without letting the workman be aware of the actual weight of the device 6.

After fixing the shift lever device 6 to the instrument panel 1 and the vehicle body, the console panel 5 is provided on the side faces of the shift lever device 6. After aligning the positioning holes 32, 33 of the console panel 5 with the mounting holes 1a of the instrument panel 1, the upper portion of the console panel 5 is fixed to the instrument panel 1 by means of the screws 31. The side portions of the console panel 5 are fixed to the instrument panel 1 with the screws 34a screwed into the mounting holes 34.

Figure 7B:
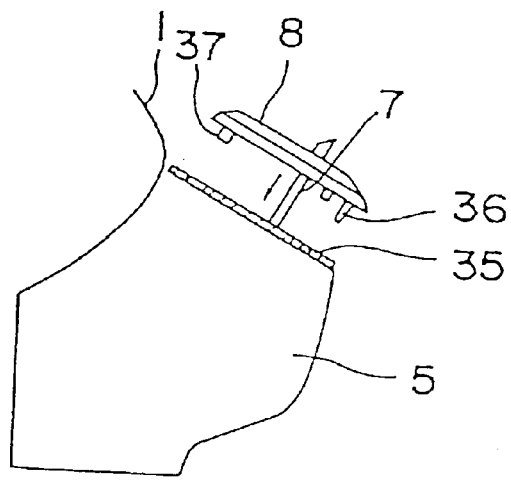

After fixing the console panel 5 to the instrument panel 1, the pin 36 formed on the rear face of the shift panel 8 is fitted in the positioning hole 35 formed on the rear side of the upper face of the console panel 5, and the plural claws 37 are brought into engagement with the edge of the opening of the console panel 5, as shown in FIG. 7(b), so that the shift panel 8 is attached to the upper opening portion of the console panel 8. The shift panel 8 is positioned relative to the console panel 5 due to the engagement of the pin 36 with the positioning hole 35.

Thus, the console panel 5 is fixed to the instrument panel 1 using the holes 32, 33, and the shift panel 8 is fixed to the console panel 5 by engaging the pin 36 with the positioning hole 35, whereby the console panel 5 provided with the shift panel 8 can be positioned and easily fixed to the instrument panel 1.

Figure 7C:
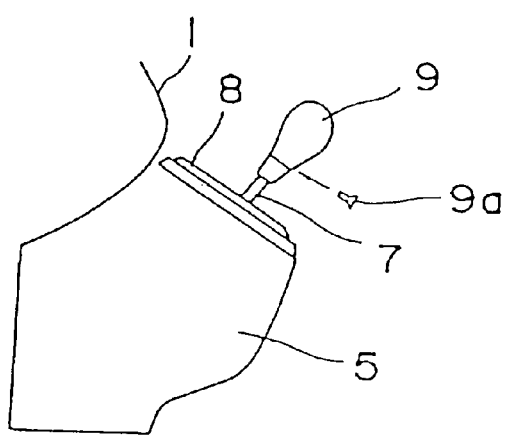

In the final step, the shift lever knob 9 is fitted on the upper end of the shift lever 7, and fixed in position by means of a screw 9a, as shown in FIG. 7(c). In this manner, the gearshift assembly can be installed on the central, lower portion of the instrument panel 1, as shown in FIG. 1. The shift lever knob 9, which is fixed to the shift lever 7 in the final assembling step, does not interfere with other components during installation of the assembly on the instrument panel 1, and therefore the shape of the shift lever knob 9 may be selected with increased freedom.

In the gearshift assembly as described above, the shift lever device 6 is positioned relative to the instrument panel 1 due to the engagement of the guide pin 15, and the console panel 5 is positioned relative to the instrument panel 1 using the positioning holes 32, 33, as shown in FIG. 2 through FIG. 4. With this arrangement, the shift lever device 6 and the console panel 5 are positioned relative to the instrument panel 1, and the position of the console panel 5, relative to the shift lever device 6, is accurately determined on the basis of the instrument panel 1. As a result, the shift lever device 6 for performing a gearshift operation of the transmission can be installed on the instrument panel 1 without causing any variation in the installation position of the shift lever 7.

Since the shift panel 8 is positioned relative to the console panel 5 due to the engagement of the pin 36 with the positioning hole 35, the position of the shift panel 8 relative to the shift lever 7 of the shift lever device 6 is determined with high a accuracy. Also, the shift lever device 6 is positioned due to the engagement of the guide pin 15 of the shift lever device 6 with the positioning hole 1b formed in the vicinity of the shift panel 8. This arrangement results in reduction in the degree of deviation of the operated positions of the shift lever 7 from corresponding shift positions (P, R, N, D, and so on) indicated on the labeled portion 8a of the shift panel 8.

In the above-described method of assembling the gearshift assembly, the heavy shift lever device 6 is rotated about the support bolts 14 to be raised to the nominal position, so that the upper end portion of the shift lever device 6 is positioned and attached to the instrument panel 1, while the engaging portions between the notches 10 of the support frame 11 and the bolts 14 receive the load of the device 6 and position the lower portion of the device 6. Thus, the shift lever device 6 can be easily and accurately fixed in position with a reduced number of assembling steps, while preventing the workman from being aware of the actual weight of the shift lever device 6. Consequently, the shift lever device 6 for performing a gearshift operation of the transmission can be suitably installed on the instrument panel 1 without causing variations in the installation position of the shift lever 7.

The console panel 5 is fixed to the instrument panel 1 using the holes 32, 33, and the shift panel 8 is fixed to the console panel 5 by engaging the pin 36 with the positioning hole 35, so that the console panel 5 provided with the shift panel 8 can be easily and accurately fixed to the instrument panel 1. Furthermore, the shift lever knob 9 is fixed to the shift lever 7 in the final assembling step, and therefore does not interfere with other components during installation of the gearshift assembly on the instrument panel 1.

The first positioning mechanism of the illustrated embodiment may be modified such that shaft members, such as the support bolts 14, are provided on the support frame 11, and notches that engage with the shaft members are provided on the support members 13 on the side of the floor of the vehicle. The second positioning mechanism of the illustrated embodiment may also be modified such that the guide pin 15 is provided on the instrument panel 1, and a positioning hole that engages with the pin 15 is formed in the pedestal 12 of the shift lever device 6.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An arrangement for attaching a gearshift assembly for a motor vehicle, wherein a shift lever device for a gearshift operation of a transmission of the vehicle is installed within a vehicle compartment, comprising:

a receiving portion provided within the vehicle compartment;

an engaging portion formed on the shift lever device, said engaging portion engaging said receiving portion to rotatably support the shift lever device with respect to the receiving portion; and a mounting portion provided on the shift lever device at a position higher than said receiving portion, said mounting portion fixedly attaching the shift lever device at a predetermined position within the vehicle compartment after rotating the shift lever device about said receiving portion to the predetermined position.

2. An arrangement for attaching a gearshift assembly as defined in claim 1, wherein said shift lever device is attached to an instrument panel provided within the vehicle compartment, said arrangement further comprising:

a console panel attached to said instrument panel to cover a side face of the shift lever device.

3. An arrangement for attaching a gearshift assembly as defined in claim 2, further comprising:

a shift panel attached to said console panel to cover an upper face of the shift lever device.

4. An arrangement for attaching a gearshift assembly as defined in claim 1, wherein said receiving portion includes a shaft member, for rotatably supporting said engaging portion, provided on a member on the side of a vehicle body, and extends in the lateral direction of the vehicle.

5. An arrangement for attaching a gearshift assembly as defined in claim 1, wherein the shift lever device includes a support frame that extends downwards, and said receiving portion is provided at a lower end portion of said support frame, while said mounting portion is provided at an upper end portion of the support frame.

6. An arrangement for attaching a gearshift assembly as defined in claim 4, wherein said engaging portion is a C-shaped notch that releasably engages said shaft member.

* * * * *